United States Patent [19]

Carrier et al.

[11] Patent Number: 5,197,361
[45] Date of Patent: Mar. 30, 1993

[54] SURFACE CONTOURING TOOL

[75] Inventors: Charles W. Carrier, West Chester; Frank W. Gorsler, Cincinnati, both of Ohio

[73] Assignee: General Electric Company, Cincinnati, Ohio

[21] Appl. No.: 774,907

[22] Filed: Oct. 11, 1991

[51] Int. Cl.⁵ .............................. B23B 41/12
[52] U.S. Cl. ...................... 82/1.2; 82/1.4; 82/134; 408/59; 408/181; 409/143
[58] Field of Search .......... 82/1.2, 1.4, 1.5, 134; 408/147-151, 153, 158, 159, 180, 181, 187, 13, 54, 708, 56, 59; 409/199, 201, 218, 143

[56] References Cited

U.S. PATENT DOCUMENTS

| | | | |
|---|---|---|---|
| 1,356,871 | 10/1920 | Martin | 408/181 X |
| 2,284,336 | 5/1942 | Morrison | 77/1 |
| 2,404,433 | 7/1946 | Christman | 77/3 |
| 2,486,555 | 11/1949 | Cordell | 82/152 X |
| 2,744,423 | 5/1956 | Edera et al. | 408/147 |
| 3,237,486 | 3/1966 | Gilbert et al. | 408/181 X |
| 3,290,965 | 12/1966 | Gaev et al. | 82/1.4 |
| 3,343,243 | 9/1967 | Renker | 82/134 X |
| 3,383,957 | 5/1968 | McCann | 82/1.4 |
| 3,821,921 | 7/1974 | Rosenberg | 82/134 X |
| 3,893,355 | 7/1975 | Maastricht | 408/60 X |
| 4,218,941 | 8/1980 | David-Malig | 82/1 |
| 4,224,846 | 9/1980 | Eysel | 82/36 |
| 4,246,812 | 1/1981 | Gladwin | 82/1 |
| 4,250,775 | 2/1981 | Jerue | 82/1 |
| 4,375,773 | 3/1983 | Liermann | 82/1.2 |
| 4,509,236 | 4/1985 | Morita et al. | 82/1.5 X |
| 4,693,643 | 9/1987 | Mair et al. | 408/59 |

FOREIGN PATENT DOCUMENTS

| | | | |
|---|---|---|---|
| 2734126 | 2/1979 | Fed. Rep. of Germany | 82/1.2 |
| 8606669 | 11/1986 | PCT Int'l Appl. | 82/1.2 |

*Primary Examiner*—Z. R. Bilinsky
*Attorney, Agent, or Firm*—Jerome C. Squillaro; Charles L. Moore, Jr.

[57] ABSTRACT

There is provided by the present invention a surface contouring tool useful for reaching otherwise inaccessible working surfaces such as large diameter gas turbine engine rotor inner surfaces, the invention including a machining head means extendable from a nonworking position to a working position relative to the working surface and when the machining head means is useful for EDM or ECM machining further includes a fluid flow path for providing a machining fluid to the working surface head and means for rotating the machining head means.

19 Claims, 8 Drawing Sheets

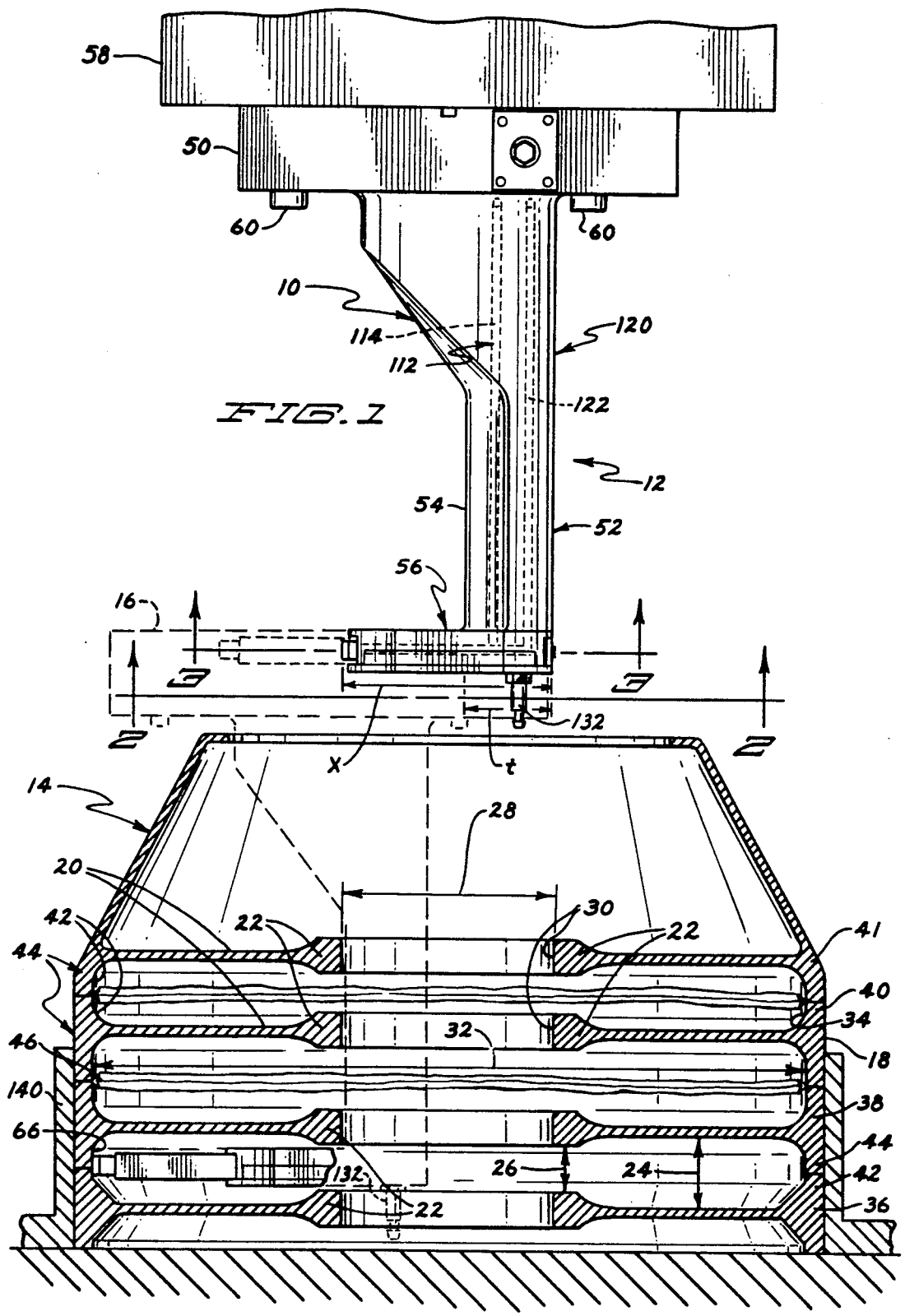

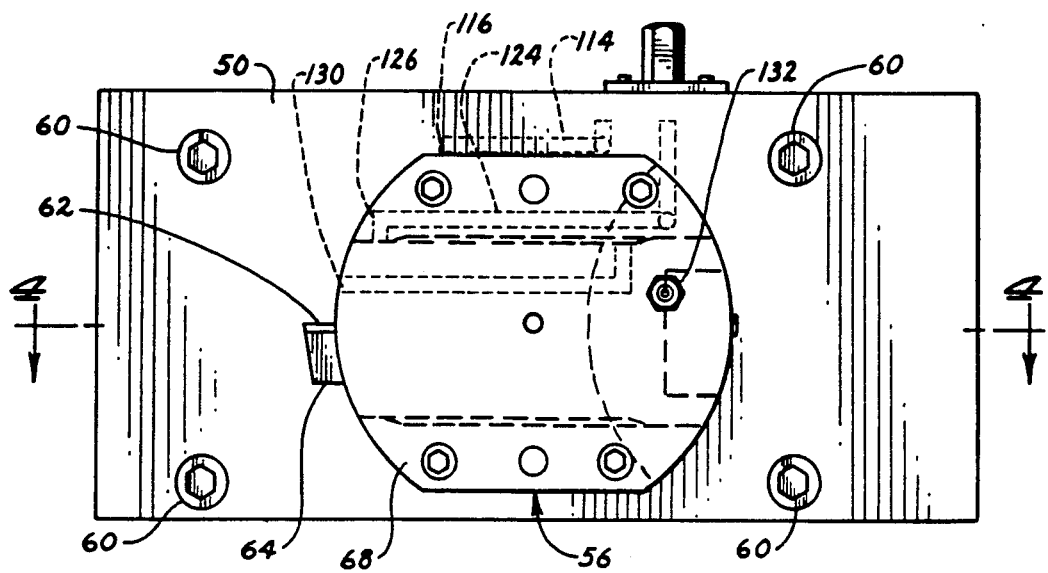
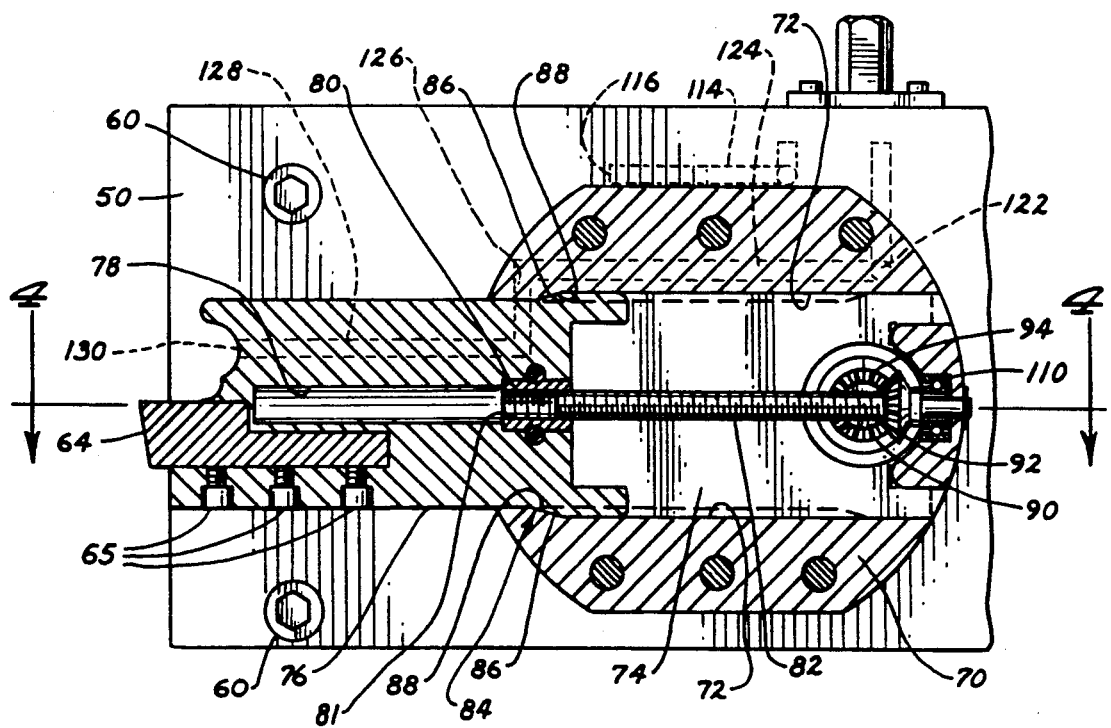

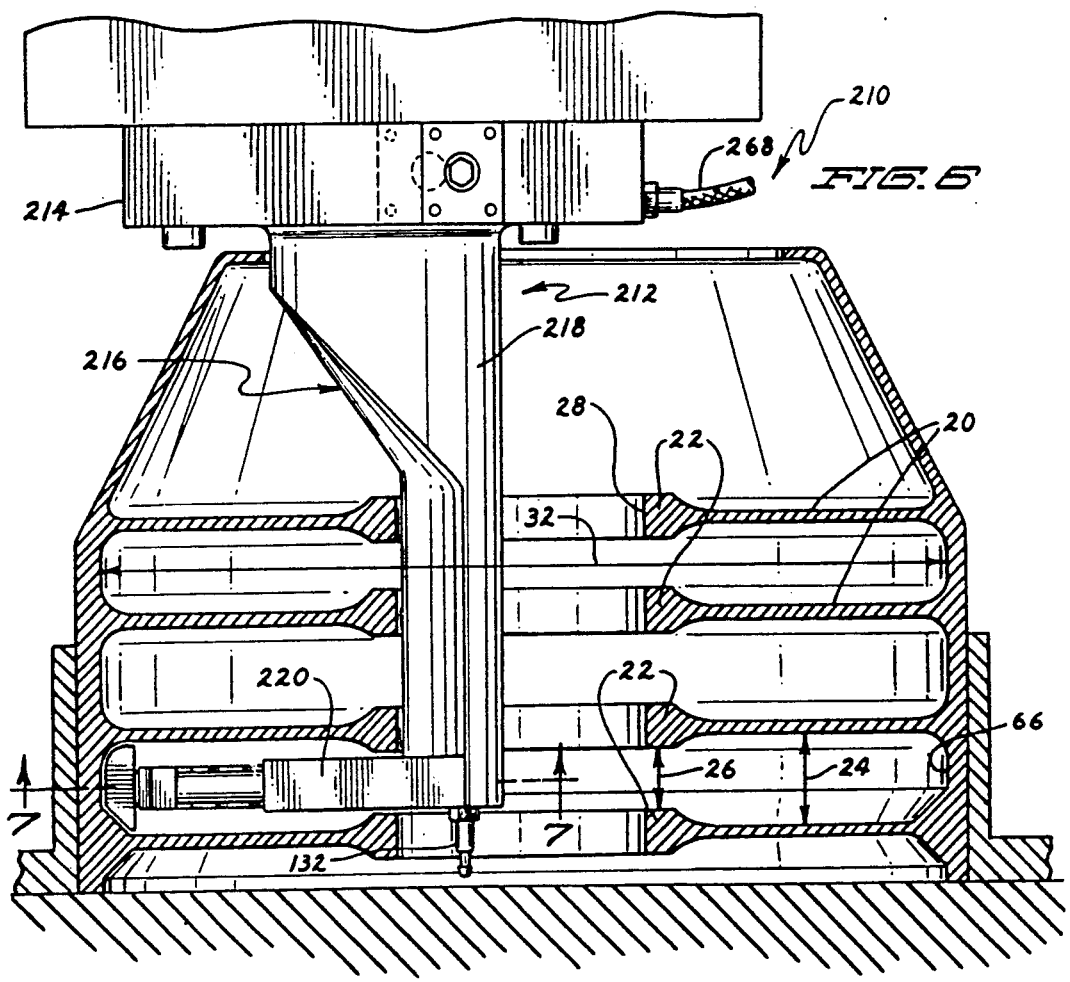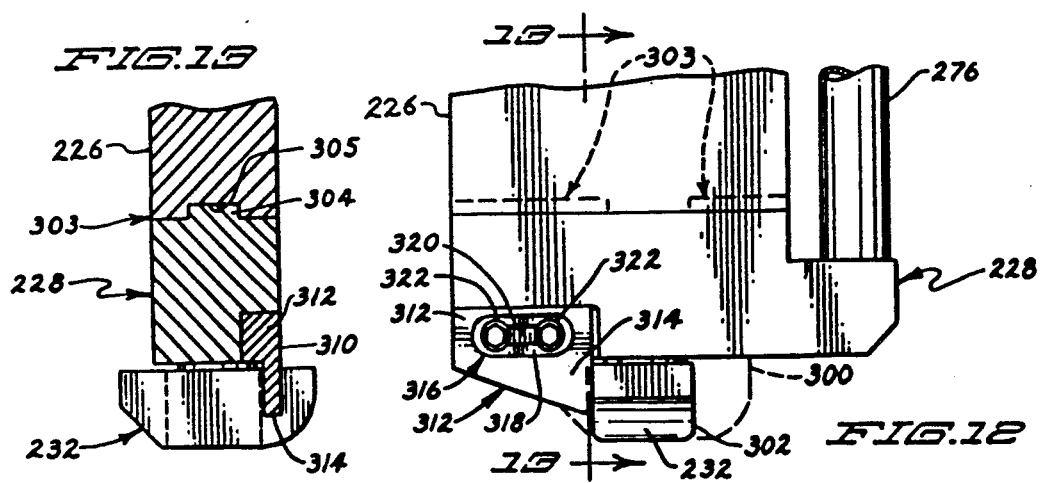

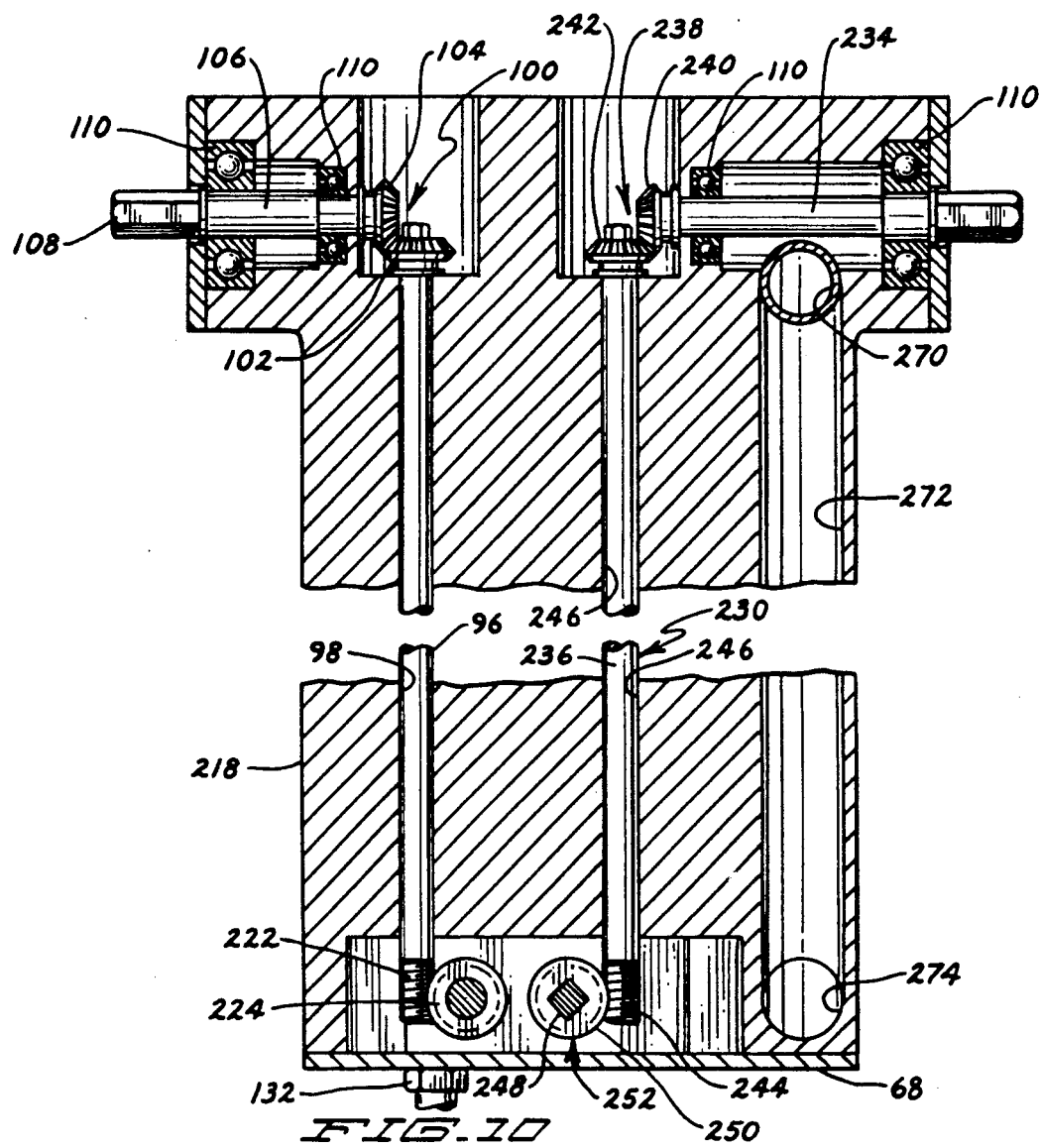
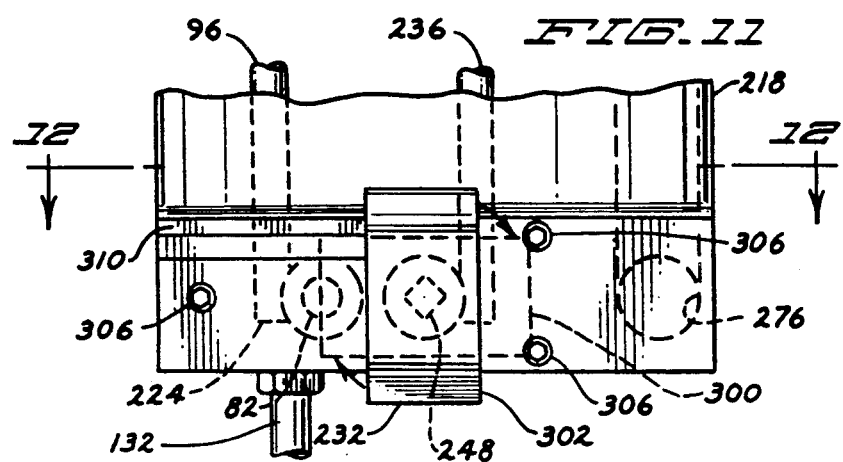

SURFACE CONTOURING TOOL

The present invention relates generally to machining tools for providing a desired surface contour on an article of manufacture and in particular to such machining tools useful for providing desired surface contours on a surface that may be otherwise inaccessible with known machining tools, such as the interior surface of a gas turbine engine rotor.

BACKGROUND OF THE PRESENT INVENTION

The basic structural features of an axial-flow gas turbine engine are well known. In brief, the engine comprises a compressor section, combustor section and turbine section arranged longitudinally around the engine centerline so as to provide an annular gas flow path. The compressor section compresses incoming atmospheric gases that are then mixed with a combustible fuel product and burned in the combustor section to produce a high energy exhaust gas stream. The turbine section extracts power from the exhaust gas stream to drive the compressor section. The exhaust gas stream produces forward thrust as it rearwardly exits the turbine section. Some engines may include a fan section, which is also driven by the turbine section, to produce by pass thrust.

Both the compressor and the turbine section include an inner rotor having a plurality of blades extending substantially radially outwardly therefrom and arranged in groups of circumferential rows. The rows of rotor blades are interdigitated with radially inwardly extending rows of blades attached to an outer engine casing. Depending upon the particular gas turbine engine involved, the inwardly extending blades may also rotate.

In general, the compressor or turbine rotor comprises a generally cylindrically shaped spool having a plurality of webs extending radially inwardly from the inner surface of the spool. The webs each terminate in an annular thickened portion known as a disk, leaving a circumferential opening at the center thereof. Effectively, these openings form the bore of the rotor through which the engine drive shafts extend.

Because of the great rotational speeds of the rotors, it is important to balance the rotors to minimize engine vibrations. To this end, engine manufacturers strive to remove any excess material that may unbalance the rotors. Additionally, because of the fact that increasing engine weight decreases engine efficiency, it is important for engine manufacturers to remove as much unneeded material as possible from the engine parts. In particular, where engine parts are welded together, such as rotor sections that are joined by the inertia welding, electron beam welding, laser welding, or other forms of materials joining processes, it is incumbent upon the manufacturer to remove welding flash that is created during the materials joining operation from both the inner and outer spool surfaces.

Commonly, the welding flash is removed from the inner spool surface by conventional machining techniques wherein a machining means is moved into a working relationship with a rotating working surface. That is, a machining or surface contouring tool having an elongate mounting post with a tool holder attached to the end of the post is inserted into the bore of the rotating rotor. The tool holder has a machining insert disposed at the end thereof such that the machining post and tool holder/insert together have a generally "L" shaped configuration. The tool is then moved so that the insert is in a working position relative to the working inner rotor surface.

It is mechanically advantageous for an engine to have a large internal rotor or spool diameter d relative to the bore diameter b. This ratio is in part dependent upon the ability of the available machining tools to work the surfaces to the desired contours. With currently available machining tools it can be shown that the relationship between these two quantities is defined by the following equation:

$$d_{max} = 3b - 2t,$$

where $d_{max}$ equals the maximum internal rotor surface diameter that can be machined by currently available machining or contouring tools; b = the bore diameter; and t = the thickness of the tool mounting post.

Because of the mechanical advantage of a large spool diameter to bore diameter ratio, it would be desirable to have a machining tool having an increased reach so that the ratio $d_{max}/b$ can be increased over that presently achievable with currently available machining tools. Such an improved surface contouring tool would enable engine manufacturers to build gas turbine engines where rotor dimensions are dictated by engine operating dynamics rather than by manufacturing limitations.

SUMMARY OF THE INVENTION

A surface contouring tool having an extendable surface contouring or machining head is provided in accordance with the present invention. The contouring tool has a main tool body rigidly attached to a tool base. The main tool body includes an elongate mounting post that is attached at one end thereof to the tool base and further includes a tool holder attached at the other end of the mounting post. The tool holder includes a contouring head means extendably attached thereto. Contouring head extension drive means extend through the tool for extension of the head means to a working position relative to the inner spool surface after the tool has been inserted into the bore of a rotor.

In a representative embodiment, the contouring or machining head is mounted to a tool slide that is reciprocally, slidably received within a channel formed within the tool holder, thereby providing for extension and retraction of the contouring head as desired. The contouring head extension means may be mechanically or hydraulicly driven. In a representative embodiment of a mechanical head extension means, the contouring tool of the present invention includes a stub crankshaft that extends through the side of the tool base and rotationally, drivingly engages a gear assembly that extends substantially transversely to the axis of the stub crankshaft through the mounting post. The slide drive means in turn is rotationally, drivingly engaged through another gear assembly to a threaded rod extending through the tool holder. The threaded rod is received by a threaded receiver rigidly disposed in the tool slide such that as the threaded rod is rotated in one direction, the rod is turned into the threaded receiver and the tool slide, and hence the head means, is extended. When the threaded rod is rotated in the other direction, the tool slide is retracted. Thus the head means can be moved from a first, non-working position relative to a working surface into a second, working position relative thereto.

In one embodiment of the present invention, the tool slide includes a contouring head having a conventional machining insert. In another embodiment of the present invention, the tool slide includes a contouring head for use in electro-chemical or electro-discharge types of machining. In this latter embodiment the contouring head may be rotatable by a head rotation means.

The foregoing features and advantages of the present invention will become apparent to those skilled in the art when the following detailed description of the invention is read in conjunction with the accompanying drawings and claims. Throughout the drawings, like numerals refer to similar or identical parts.

BRIEF DESCRIPTION OF THE DRAWINGS

FIG. 1 illustrates a surface contouring tool according to the present invention in a non-working position relative to a gas turbine engine rotor that is shown in cross-section and further illustrates in partial phantom outline the contouring tool in a working position.

FIG. 2 illustrates the tool of FIG. 1 in an end plan view along viewing plane 2—2 of FIG. 1.

FIG. 3 shows the tool illustrated in FIG. 1 along cutting plane 3—3 thereof and depicts a cross-sectional end plan view of the tool holder in an extended working position.

FIG. 6 shows another embodiment of the contouring tool of the present invention in working position in relation to a gas turbine engine rotor.

FIG. 10 shows a partial cross-sectional, top plan view of the contouring tool shown in FIG. 6 taken along cutting plane 10—10 of FIG. 8.

FIG. 11 illustrates a top plan view of the tool holder of the contouring tool shown in FIG. 6 with the contouring head shown in a working position and in phantom in a non-working position.

FIG. 12 shows a partial end plan view of the tool holder shown in FIG. 6 taken along viewing plane 12—12 of FIG. 11 with the contouring head shown in a working position and in phantom in a non-working position.

FIG. 13 shows a partial cross-sectional view of the tool holder taken along cutting plane 13—13 of FIG. 12.

DETAILED DESCRIPTION OF THE PRESENT INVENTION

Figure 4:
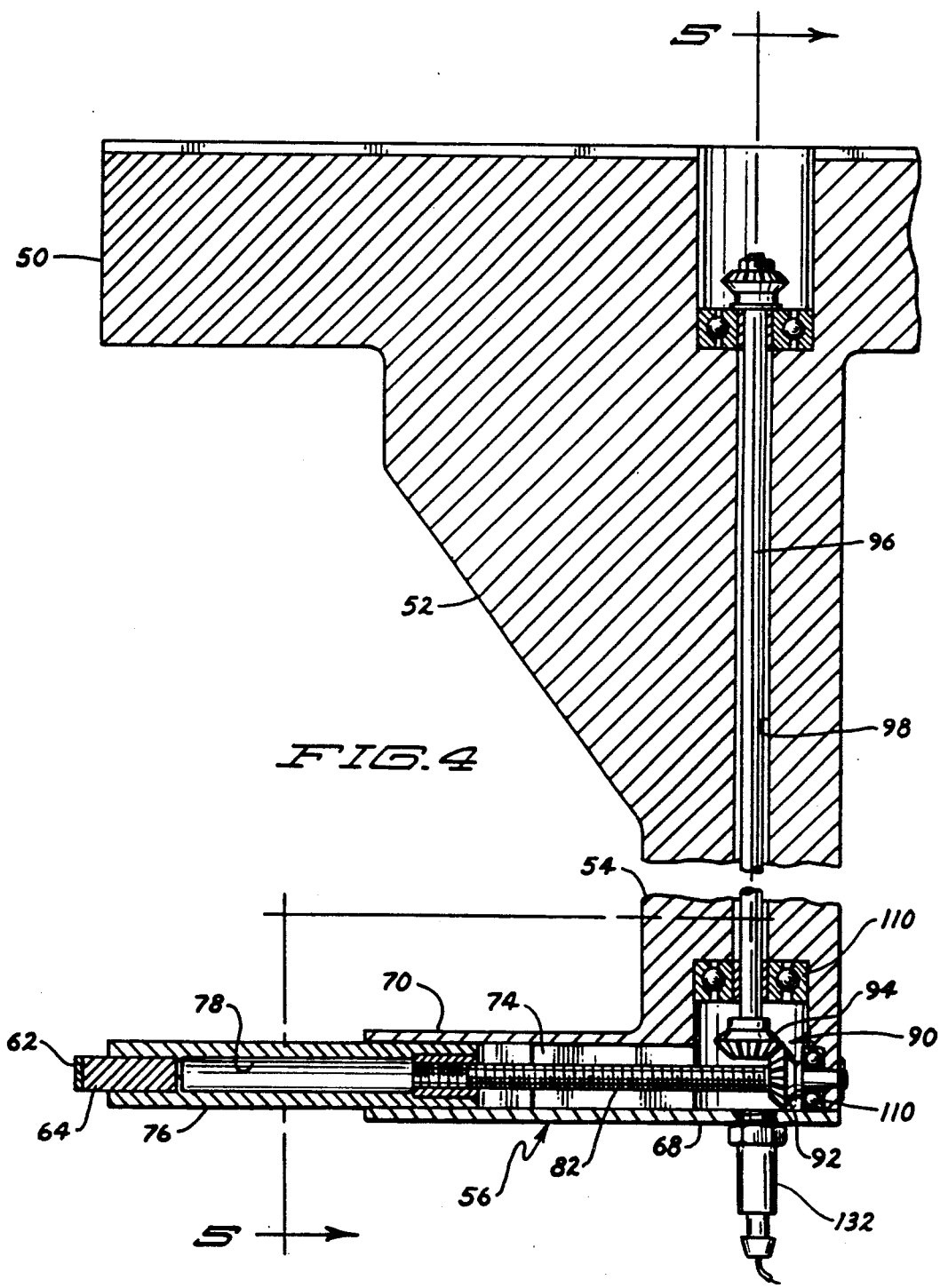
FIG. 4 depicts a cross-sectional, side elevation view of the contouring tool shown in FIG. 1 taken along cutting plane 4—4 of FIG. 3.

FIG. 1 shows a contouring tool 10 in accordance with the present invention shown in a non-working position 12 relative to a gas turbine engine rotor 14 and in a working position 16 in a partial phantom outline. Rotor 14 is shown highly idealized since actual configurations vary between engines and the present invention is generally applicable to all engine rotors. Rotor 14 comprises a spool 18 having a plurality of webs 20 that extend radially inwardly. Webs 20 terminate in a thickened disk portion 22. Adjacent webs 22 are separated by an inter-web gap 24 while adjacent disk portions 22 are separated by an inter-disk gap 26. A bore 28 is defined by the inner surface 30 of the disk portions 22 while an internal rotor diameter 32 is defined by the inner surface 34 of spool 18.

Rotor 14 may be manufactured by well known techniques of inertia welding or other means of materials joining processes of individual circumferential rotor sections such as sections 36, 38, 40, and 41. Each rotor section 36, 38, 40, and 41 includes a spacer arm portion 42 that when welded to an adjacent spacer arm portion forms a spacer 44 of spool 18. During the joining of spacer arm portions 42 to form spacers 44, welding flash 46 may be created on both the interior and exterior surfaces of spool 18. Removal of the welding flash 46 from the exterior surface of rotor 14 is relatively easy compared to its removal from the interior surface. Removal of welding flash 46 is necessary to provide a properly balanced engine as well as to provide an engine having as little weight as possible. The ability to remove the welding flash 46 is limited, however, by the reach of the contouring head of the tool used for the removal.

Contouring tool 10 provides an extendable contouring head allowing greater reach and thus allowing the ratio of the rotor diameter 32 to the bore diameter 28 to be maximized. As shown in FIG. 1, tool 10 includes a tool base 50 and a main tool body 52. Main tool body 52 comprises first and second tool body sections 54 and 56, i.e., a mounting post 54 and a tool holder 56, angularly disposed to one another. Tool base 50 is attached to a tool mount 58 by fastening means such as threaded bolts 60. Tool holder 56 in its non-working position 12 has a maximum length x that is less than bore diameter 28. This is necessary in order for contouring tool 10 to be inserted within bore 28. With a conventional contouring tool, it can be shown that the working surface that can be reached by the tool can be no farther from the inner surface of the disk than a distance that is equal to x−t, where t is equal to the thickness of mounting post 54. As previously indicated, then, a conventional machining tool requires large bore diameters when the working surface is at a large diameter and, as noted, is mechanically disadvantageous.

Referring now to FIGS. 1–5, contouring tool 10 will be further described. Tool 10 includes a machining or contouring head means such as conventional machining insert 62 and an insert holder 64 for holding machining insert 62 in place. A plurality of bolts 65 is used to properly position insert holder 64 and thus machining insert 62 for use. As will be described hereafter with reference to the Figures, machining insert 62 is extendable between non-working and working positions, thus allowing gas turbine engine rotors such as rotor 14 to be manufactured with a greater internal rotor diameter to bore diameter ratio.

Thus, tool 10 includes means for extending insert 62 into a working relationship with a working surface 66, such as that shown in FIG. 1 positioned between sections 36 and 38. Referring particularly to FIGS. 2–4, tool holder 56 includes spaced apart cover and bottom plates 68 and 70 respectively. Bottom plate 70 includes a pair of spaced apart, upwardly extending side walls 72. Together, plates 68 and 70 along with side walls 72 define a substantially rectangular channel 74 in which a tool slide 76 reciprocally moves. Insert holder 64 is attached to tool slide 76 at the free end thereof. Tool slide 76 further includes a centrally disposed slide bore 78 having a receiving means 80. Receiving means 80 has a threaded bore 81 for receiving a threaded rod 82. Receiving means 80 may be a rigidly held threaded plug as shown in the Figures or a threaded bore formed in slide 76. As threaded rod 82 is rotated, it will be threadably received by receiving means 80, causing tool slide 76 to be reciprocally movable within channel 74. Thus, rotation of threaded rod 82 will extend tool slide 76 from a non-working position such as position 12 shown in FIG. 1, to a working position such as position 16 also shown in FIG. 1. Reversing the rotation of threaded rod 82 will retract tool slide 76 from its working position 16 to its non-working position 12. Thus, FIG. 2 shows the tool slide retracted to a nonworking position while FIG. 3 shows tool slide 76 extended to a working position. When tool slide 76 is retracted, slide bore 78 will receive threaded rod 82 as the end thereof is turned into and through threaded receiver 80. Maximum extension of tool slide 76 is defined by a stop means 84 such as interfering slide shoulders 86 and channel shoulders 88.

Figure 5:
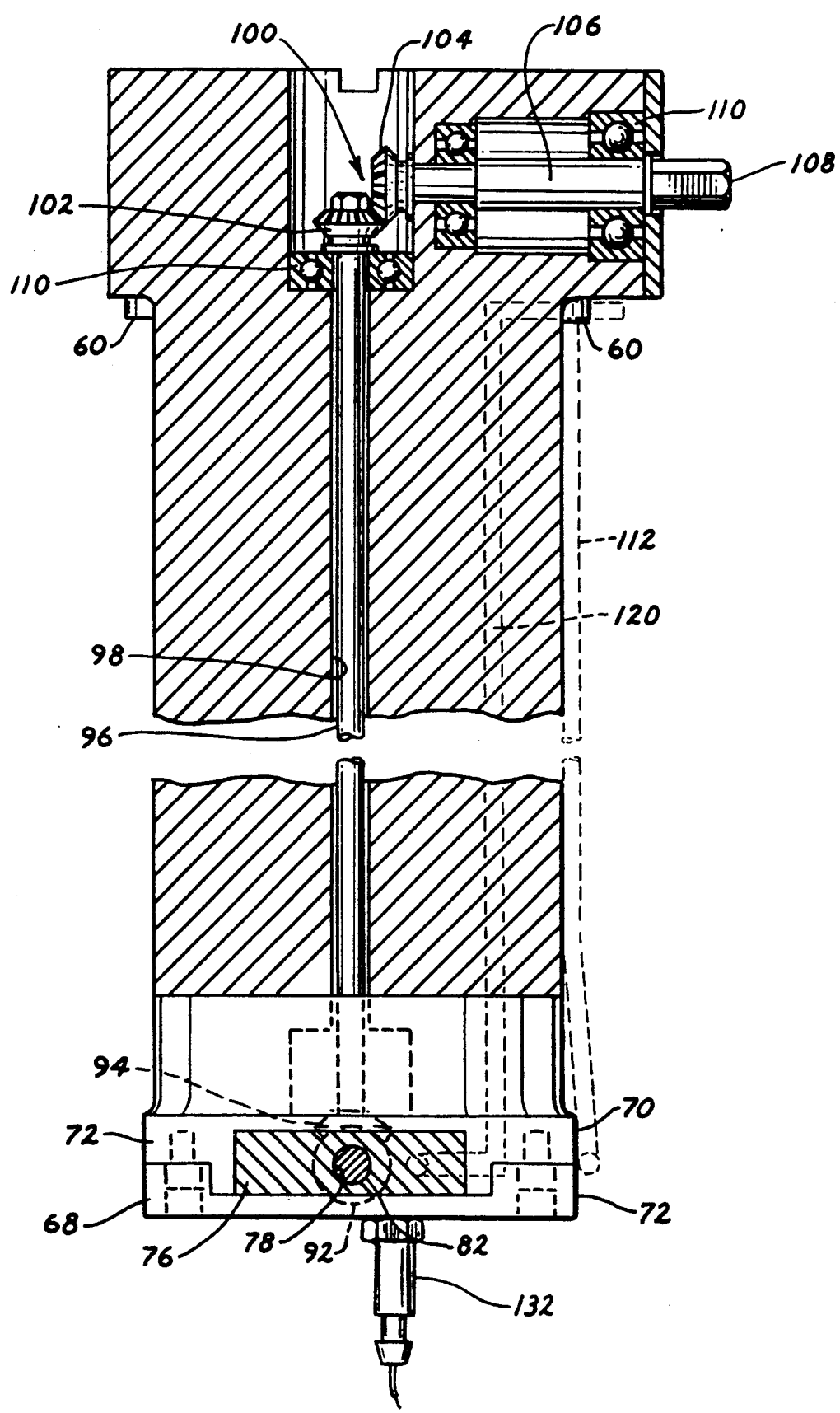
FIG. 5 shows a partial cross-sectional, top plan view of the tool shown in FIG. 1 taken along cutting plane 5—5 of FIG. 4.

Referring principally to FIGS. 4 and 5 now, rotation of threaded rod 82 is achieved through a gear assembly 90. Gear assembly 90 includes a first gear means 92 attached to threaded rod 82. Gear means 92 may be a hardened, miter bevel gear type. Gear assembly 90 further includes a second gear means 94 in driving contact with gear means 92. Gear means 94 may be a thrust bevel type of gear. Gear means 94 is attached to an end of a tool slide drive means such as connecting rod 96. Means 96 is disposed in a bore 98 extending longitudinally through mounting post 54. Tool slide drive means 96 is in turn activated through a gear assembly 100 (FIG. 5) comprising a gear means 102 attached to the other end of slide drive means 96 Gear means 102 may be a bevel gear. Gear assembly means 100 further comprises a gear means 104 which may be a hardened, miter bevel gear. Gear means 104 is attached to the end of a stub crankshaft 106 having a crank end 108 that extends through a side wall of tool base 50. Gear assemblies such as worm/worm gears are also within the purview of the present invention.

Threaded rod 82, slide drive means 96, and crank shaft 106 may all be supported by appropriate rotation facilitating means such as bearing means 110. Thus, slide drive means 96 and stub crank shaft 106 are both supported at their respective ends by a bearing means 110. Bearing means 110 may be a roller bearing and may if desired be self-aligning. Furthermore, threaded rod 82 may be supported by a bearing means 110 at its end where gear means 92 is attached. The other end of threaded rod 82 is rotationally supported by receiver 80.

Because conventional machining involves physical contact between machining insert 62 and working surface 66 (FIG 1), considerable heat can be generated during the machining process. Thus, it is generally preferred that a coolant be sprayed on the working surface during machining operations. Two alternative locations for coolant lines or flow paths are shown in phantom in the Figures. In a first alternative, the fluid flow line is entirely external of the contouring tool 10. Thus, the first alternative coolant line 112 includes a conduit 114 that is connected to a coolant supply (not shown). Coolant conduit 114 extends along mounting post 54 to tool holder 56 where it curves upwardly along the edge of tool holder 56 as shown in FIG. 3. Coolant flows through conduit 114 from the coolant supply and exits the open end 116 from which it sprays onto the working surface 66 during machining operations. The coolant flowing through conduit 114 thus acts to cool the working surface and machining insert 62 and also carries away the waste material generated during machining operations.

In the second alternative, a coolant line 120 is disposed internally of contouring tool 10. As shown in the Figures, coolant line 120 includes a fluid feed bore 122 extending substantially parallel to slide drive means 96 internally of mounting post 54. Fluid feed bore 122 is connected at its end near tool base 50 to a coolant supply. At its other end, fluid feed bore 122 is connected to a tool holder fluid bore 124 that extends internally of bottom plate 70 substantially parallel to threaded rod 82. Tool holder fluid bore 124 includes a short right angle bore section 126 that extends from the other end of fluid bore 124 at substantially right angles thereto so as to be aligned with an end of an L-shaped tool slide fluid bore 128, all as shown in FIG. 3. The other end 130 of tool slide fluid bore 128 is open to allow coolant flowing through coolant line 120 to exit therefrom and to be sprayed onto working surface 66, thus cooling the working surface and carrying away waste material in the same manner as coolant line 112.

To extend tool slide 76 so that machining insert 62 is properly positioned to contour working surface 66, an actuation means such as an electric motor is attached to crank end 108 to rotate stub crankshaft 106. Gear assembly means 100 changes the direction of power transmission by 90° and causes tool slide drive means 96 to rotate. Power transmission is changed through a second 90° turn by gear assembly 90 disposed in tool holder 56, thus causing threaded rod 82 to rotate. As threaded rod 82 rotates, slide 76 is driven outwardly within channel 74, thus extending machining insert 62 outwardly from main tool body 52. Tool slide 76 may be extended until stop means 84 (FIG. 3) prevents further extension thereof. When properly extended, machining insert 62 is in position to begin contouring of working surface 66. During the machining operation, rotor 14 is held by a work piece fixture 140 (FIG. 1).

A tool 10 according to the present invention, then, has an extendable machining head means that may be reciprocally moved between non-working and working positions relative to the working surface 66. It can be shown that the tool reach, i.e., the maximum internal rotor surface that can be machined by such a tool 10 is $$d_{max} = 3b - 2t + 2L,$$

where L equals the increased reach provided by the extendable, telescoping portion of tool 10. If L equals one half of the bore diameter b, then the above equation becomes:

$$d_{max} = 4b - 2t,$$

which is a substantial increase over that presently provided by known machining equipment.

To avoid unintentional damage to a rotor by attempting to withdraw tool 10 from bore 28 with the tool slide 76 extended, tool 10 may include a proximity sensor 132, best seen in FIGS. 1 and 4. Sensor 132 may be appropriately electrically connected to a warning device and/or a dead man type of switch that will operate to prevent tool 10 from being withdrawn from bore 28 with the slide 76 in its extended position.

Because conventional contouring is a contact operation, that is, the machining insert is in physical contact with the working surface, the extendibility of machining insert 62 is limited by several factors, among them the hardness of the material being machined, and the rigidity of the various portions of contouring tool 10. In addition, the area of the working surface actually being machined will affect the extendibility of machining insert 62. That is, as the area being machined increases, the reach of contouring tool 10 will be decreased. Some chatter will be experienced at any length of extension and may become a serious problem beyond a certain distance and when the surface area being machined reaches certain limits in size.

Because in part of the problem with chatter, non-contact forms of machining would be desirable. Non-contact forms of machining will be less limited by both the reach of the tool and the area being machined. Such non-contact forms of surface contouring include electro-chemical machining and electro-discharge machining. As is well known in the electro-chemical and electro-discharge machining art, surface contouring is substantially accomplished by a combination of a machining fluid and an electric current that is passed between the contouring tool and the working surface. That is, the tool acts as one electrode and the working surface as the other electrode. In electro-chemical machining, an electrolytic machining fluid is used to etch away unwanted surface material with the electrical current enhancing the etching ability of the electrolytic fluid. In electro-discharge machining, the current passes through a dielectric machining fluid that washes away material removed from the working surface by the current. Thus, the former type of machining involves dissolving of the working surface and carrying away of the dissolved material in solution by the electrolytic fluid while the latter involves a washing away of working surface particles removed by the electric current.

FIGS. 6-13 illustrate a non-contact contouring tool 210 having an extendable, rotatable, contouring head attached thereto. FIG. 6 shows contouring tool 210 in a working position 212 relative to a work piece such as rotor 14. Like contouring tool 10, non-contact contouring tool 210 has an extendable head but unlike tool 10, the head of tool 210 is also rotatable so as to be able to machine a larger working surface than that of contouring tool 10. As seen in FIG. 6, the working surface 66 substantially covers the area between the webs 20. Because the inter-disk gap 26 is smaller than the inter-web gap 24, however, a contouring tool such as that shown in FIGS. 1-5 or such as those commercially available can access a working surface area having a width equal only to the inter-web gap 26 because of the need to move the tool within the smaller dimension of the inter-web gap 26. Thus, unless the machining head of the tool can rotate the tool is limited to contouring a working surface having a width less than the distance between adjacent disks.

Referring to the Figures again, non-contact contouring tool 210 includes a tool base 214 and a main tool body 216 comprising an elongate mounting post 218 attached at one end to tool base 214 and at its other end to a tool holder 220. Non-contact contouring tool 210 contains a machining head extension mechanism similar to that described relative to FIGS. 1-5 wherein contact contouring tool 10 was illustrated. Thus, only the differences between those mechanisms will be discussed. In that regard, it should be noted that the tool slide extension mechanism is positioned off-center relative to tool slide 76 (best seen in FIG. 10) unlike the tool slide shown in FIGS. 1-5. This is necessary to allow room for both the internal fluid flow paths for the ECM or EDM fluid as well as the drive mechanism for rotating the head to its machining position, which will be described further below. A further difference between the tool slide extension mechanism of tool 210 and tool 10 is that gear assembly means 90 comprises a worm/worm gear assembly (best seen in FIGS. 7, 8 and 10) rather than the bevel gear assembly shown in FIGS. 1-5. Thus, tool slide drive means 96 includes a worm 222 and the end of threaded rod 82 includes a worm gear 224 interacting with worm 222. It should be noted that the bevel gear arrangement described in relation to FIGS. 1-5 could also be used with the tool extension mechanism for the non-contact contouring tool 210, and vice versa, but the worm gear/worm arrangement provides an advantage of requiring less space than the bevel gear arrangement previously discussed and is thus preferable where space is limited.

Figure 7:
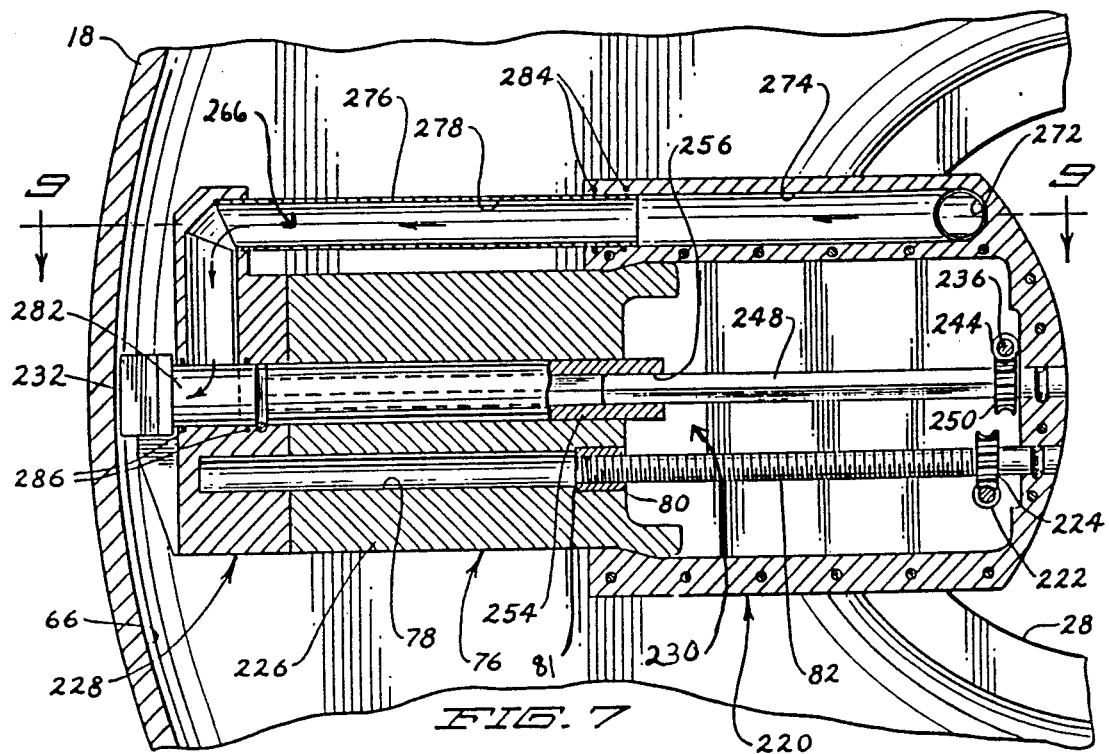
FIG. 7 shows a cross-sectional, end plan view of the tool holder shown in FIG. 6 taken along cutting plane 7—7 thereof, wherein the contouring head is in a working position.
Figure 8:
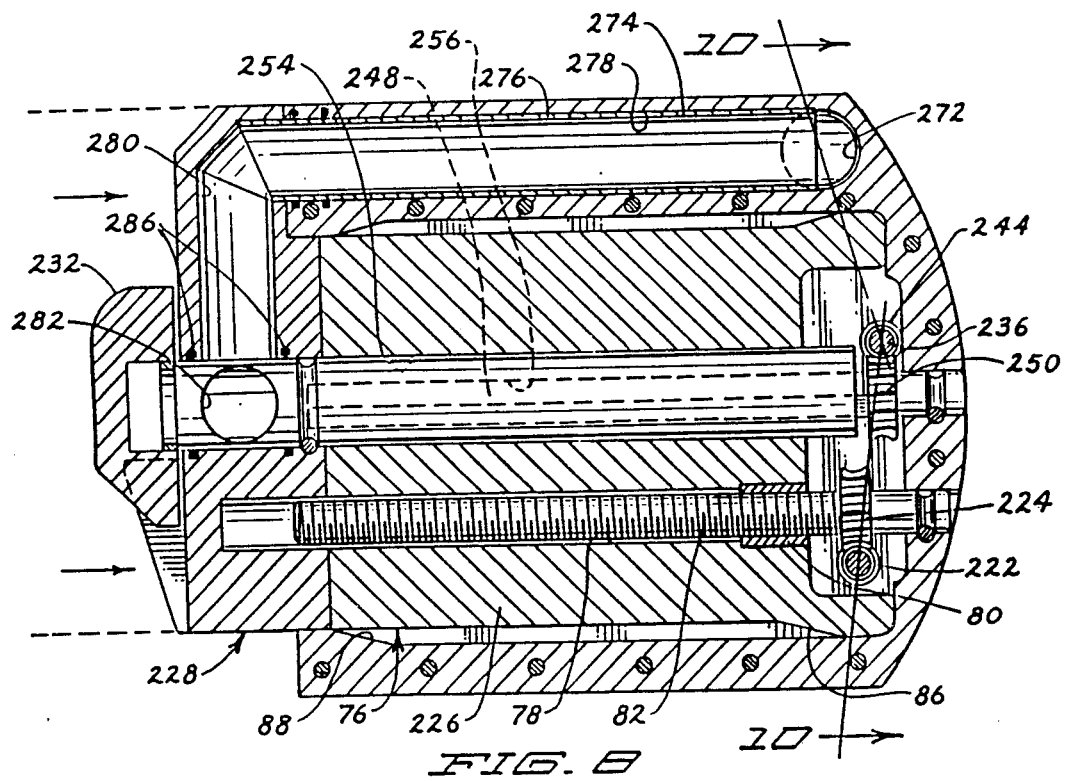
FIG. 8 shows a cross-sectional, end view of the tool holder of the contouring tool shown in FIG. 6 with the contouring head in a non-working position.
Figure 9:
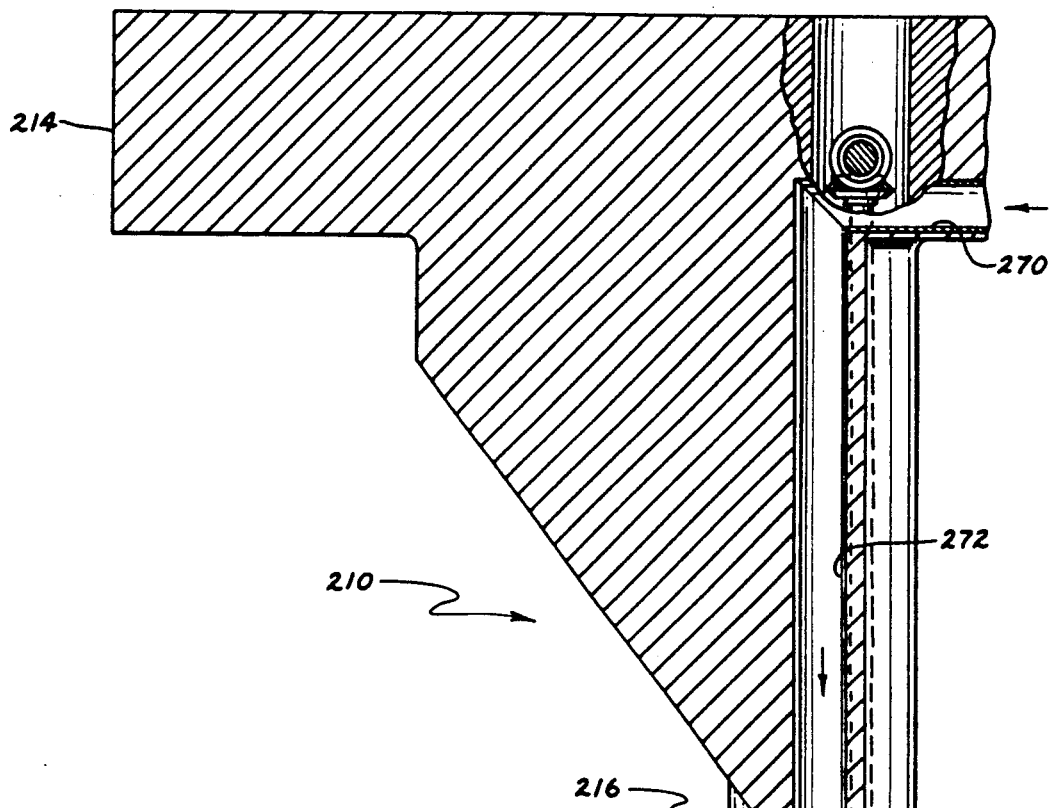
FIG. 9 depicts a cross-sectional, side elevation view of the contouring tool shown in FIG. 6 taken along cutting plane 9—9 of FIG. 7.

Referring now to FIGS. 7 and 8 principally, the tool slide 76 of non-contact contouring tool 210 includes a tool slide base 226 to which a machining head assembly 228 is removably attached. Assembly 228 and its removable attachment mechanism will be described further below. Occupying the central position of tool slide 76 previously utilized by the tool extension mechanism in tool 10 is a machining head rotating mechanism 230. Mechanism 230 rotates a non-contact machining head 232, which forms part of machining head assembly 228, about an axis substantially parallel to the direction of extension and retraction of the tool slide 76. Machining head 232 is shown in FIG. 8 in its retracted, non-working position and in FIG. 7 in its extended, rotated working position.

Referring to FIG. 10, rotation mechanism 230 operates to rotate machining head 232 by substantially ninety degrees and includes a rotation crank shaft 234 supported at opposing ends by bearing means 110. Appropriate actuation means (not shown) may be used to rotated shaft 234. Rotation crank shaft 234 is drivingly connected to a machine head rotation means such as connecting rod 236 by a gear assembly 238. Gear assembly 238 includes a bevel gear 240 attached to the end of rotator crank shaft 234 and a bevel gear 242 whose teeth are drivingly intermeshed with those of bevel gear 240. Gear assembly 238 changes the direction of the power transmission through non-contact contouring tool 210 by approximately 90°. Connecting rod 236 has a bevel gear 242 attached at one end thereof and a worm 244 at the other end thereof. Rod 236 extends through machining post 218 in a bore 246. Worm 244 drivingly connects rod 236 with square rotation rod 248 by means of a worm gear 250 attached at the end thereof. Together worm 244 and worm gear 250 form a gear assembly 252. Gear assembly 252 changes the direction of power transmission through contouring tool 210 by approximately 90°.

Referring principally now to FIGS. 7 and 8, square rotation rod 248 is slidingly received within a sleeve 254 having an interior bore 256 having a substantially square configuration. Sleeve 254 forms part of removable head assembly 228. Thus, as rotator crank shaft 234 is turned, rod 236 will be turned due to the interaction of gear assembly 238. Square rod 248 will in turn be rotated through the interaction of gear assembly 250 and thereby will cause sleeve 254 to rotate carrying head 232 with it. While rotation rod 248 and bore 256 have been described as having a square configuration, any configuration that would prevent relative rotation of rod 248 and sleeve 254 and thus would promote synchronous rotation of rod 248 and sleeve 254 is within the purview of the present invention.

As previously noted, ECM and EDM machining require the use of a fluid during operation Thus, non-contact contouring tool 210 includes an internally disposed, machining fluid flow path 266 for carrying fluid from a fluid supply (not shown) to the working surface 66. As shown in FIG. 6, a fluid supply line 268 provides fluid to tool 210 at tool base 214 from the fluid supply. Fluid flow path 266 includes a first conduit 270 (FIGS. 9 and 10) in fluid communication with fluid supply line 268 (FIG. 6). First conduit 270, best seen in FIG. 9, communicates with a second conduit 272 extending longitudinally through tool mounting post 218. Second conduit 272 in turn is in fluid communication with a third conduit 274 extending substantially parallel to threaded rod 82 and sleeve 254. Conduit 274 slidably receives a telescoping tube 276, which is attached to and forms part of removable machining head assembly 228, having an internal fluid passage 278 in communication with conduit 274. Telescoping tube fluid passage 278 communicates with a conduit 280 extending transversely thereto. Conduit 280 in turn communicates with a fluid passage 282 (FIG. 7) disposed internally of sleeve 254 at the end thereof. Thus, as indicated in FIGS. 6, 7 and 10, fluid will enter fluid flow path 266 by a fluid supply line 268 and flow to machining head 232 by first conduit 270, second conduit 272, third conduit 274, telescoping tube fluid passage 278, conduit 280 and fluid passage 282. The fluid will exit machining head 232 through appropriately configured apertures, which are not shown for purposes of clarity. As seen in FIGS. 7 and 8, passage 282, which is disposed at the end of sleeve 254, is in a non-communicating position with conduit 280 when tool slide 76 is in its non-working position and rotatable machining head 232 is in its non-working position (FIG. 8). After tool slide 76 has been extended as shown in FIG. 7, machining head 232 is rotated to its working position as shown in FIG. 7 by means of the cooperative interaction between rod 248 and sleeve bore 256, thus placing fluid passage 282 in communication with conduit 280. To prevent fluid leakage, the third conduit 274 may include a sealing means such as O-rings 284 and sleeve 254 may likewise include a sealing means such as O-rings 286 also.

FIGS. 11-13 show additional details of the previously referred to removable machining head assembly 228. The removable nature of machining head assembly 228 allows a rapid change over when different surface contours are desired for different portions of rotor 14. Furthermore, the exact shape and location of the fluid dispensing apertures in machining head 232 will vary depending upon the material of the surface being contoured, the desired surface contour, the fluid flow, and other factors well known in the electro-chemical and electro-discharge machining arts.

Removable machining head assembly 228 may include a tongue and groove positioning arrangement 303 between tool slide base 226 and assembly 228, best seen in FIG. 13. As shown in FIG. 13, assembly 228 includes a tongue 304 while base 226 includes a mating groove 305, though the reverse is within the purview of the present invention Assembly 228 may be removably attached to tool slide base 226 by known means including fasteners 306 (FIG. 11), which may be screws, bolts or the like.

FIGS. 11 and 12 initially illustrate in phantom machining head 232 in its non-working position 300 as well as its working position 302. In addition to machining head 232 assembly 228 includes an adjustable stop means 310, which limits the rotation of head 232 to a predetermined position. As seen in cross section in FIG. 13, stop means 310 includes an attachment portion 312 by which means 310 is attached to assembly 228 and a stop portion 314 that contacts machining head 32 and thereby limits rotation of head 232 to a desired position.

It is preferred that stop means 310 be adjustable to ensure that machining head 232 is properly positioned relative to the working surface 66 when rotated from its rest position 300 to its working position 302 Thus, stop means 310 includes an adjustment means 316 disposed in attachment portion 312, best seen in FIG. 12, to properly position the adjustable stop means 310 so that machining head 232 will be rotated to the proper position. Adjustment means 316 includes a countersunk oval recess 318 having an oval shaped aperture 320 extending completely through adjustable stop means 310. A pair of fasteners 322, which may be threaded bolts or screws, may be inserted through aperture 320 into appropriately configured receiving holes in assembly 228 and then tightened until the fastener heads contact recess 318, thereby retaining stop means 310 in a desired position. Loosening of fasteners 322 will allow movement either left or right of the stop means 310 as shown in FIG. 12 so that machining head 232 will be retained in its proper machining orientation.

It should be noted that the embodiment shown in FIGS. 6-13 does not include the coolant lines shown in the embodiment of FIGS. 1-5. Because the former embodiment generates less heat generally, coolant isn't as necessary and in any event, any necessary cooling can be supplied by the fluid used in either the EDM or ECM process.

The present invention having thus been described, other modifications, alterations, or substitutions may now suggest themselves to those skilled in the art, all of which are within the spirit and scope of the present invention. It is therefore intended that the present invention be limited only by the scope of the attached claims below.

We claim:

1. Apparatus for providing a desired contour to the inner surface of a gas turbine engine rotor having an inner, working surface, said apparatus comprising:
   a tool body having first and second tool body sections, said first and second tool body sections being angularly disposed with respect to each other, said tool body being insertable into the interior of the rotor;
   a machining head means for contouring the inner surface of the rotor, said machining head means being disposed at the free end of said second body section and extendable from a first position to a second position;
   means for extending said machining head means from said first position to said second position whereat said head means is capable of contouring the inner surface of the rotor;

wherein said tool body can be inserted into the rotor and said head means can be extended from said first position to said second position for contouring the inner surface of the rotor and retracted to said first position for movement within said rotor; and means for rotating said machining head means about an axis lying substantially parallel to a direction of extension and retraction of said head means.

2. The apparatus of claim 1 wherein said means for extending includes:

first and second drive means drivingly connected to each other, said first drive means being disposed in said first tool body section, said second drive means being disposed in said second tool body section and attached to said machining head means; and a crankshaft for extending said machining head means into working engagement with the rotor surface, said crankshaft drivingly engaging said first drive means.

3. The apparatus of claim 1 wherein said second section includes:

first and second spaced apart plates defining a channel therebetween;

and wherein said means for extending includes:

a tool slide, said machining head means being attached to said tool slide, said tool slide being slidably received within said channel such that said attached machining head means is movable between said first and second position as said tool slide slides within said channel.

4. The apparatus of claim 3 wherein said tool slide further includes a threaded receiver and said means for extending further comprises:

an elongate threaded rod, an end of said threaded rod received by said threaded receiver;

first and second gear assembly means, said first gear assembly means rotationally, drivingly engaging the other end of said threaded rod;

an elongate connecting rod, said first gear assembly rotationally, drivingly engaging an end of said connecting rod and said second gear assembly rotationally, drivingly engaging the other end of said connecting rod; and a crankshaft rotationally, drivingly engaging said connecting rod through said second gear assembly, whereby said tool slide is extended from said first position to said second position by said crankshaft through driving engagement of said second gear assembly, said connecting rod, said first gear assembly, and said threaded rod.

5. The apparatus of claim 4 and further including coolant means for cooling the inner surface of the rotor and the machining head means during contouring of the rotor inner surface.

6. The apparatus of claim 4 and further including stop means for preventing overextension of said tool slide.

7. The apparatus of claim 6 wherein said stop means comprises interfering shoulders disposed on said tool slide and said channel.

8. The apparatus of claim 1 wherein said machining head means is useful for EDM or ECM surface contouring.

9. The apparatus of claim 3 and further including stop means for preventing overextension of said tool slide.

10. The apparatus of claim 9 wherein said stop means comprises interfering shoulders disposed on said tool slide and said channel.

11. The apparatus of claim 1 and further including a rotatable machining head assembly, said machining head means being attached to said machining head assembly, wherein said second tool body section includes:

first and second spaced apart plates defining a channel therebetween;

said means for extending includes:

a tool slide, said machining head assembly being attached to said tool slide, said tool slide being slidably received within said channel such that said attached machining head assembly is movable between said first and second position as said tool slide slides within said channel, said tool slide including a bore means oriented substantially parallel to the direction of extension and retraction of said tool slide;

and wherein said means for rotating rotates said rotatable machining head assembly and said attached machining head means to a working position relative to the rotor inner surface and includes:

an elongate rotation rod slidingly received by said bore means, an end of said rod being attached to said machining head assembly;

means for preventing rotation of said elongate rotation rod relative to said bore means;

first and second rotation gear assembly means, said first rotation gear assembly means rotationally, drivingly engaging the other end of said rotation rod;

an elongate rotation connecting rod, said first rotation gear assembly rotationally, drivingly engaging an end of said rotation connecting rod and said second rotation gear assembly rotationally, drivingly engaging the other end of said rotation connecting rod; and a crankshaft rotationally, drivingly engaging said rotation connecting rod through said second rotation gear assembly, whereby said machining head assembly is rotated from a non-working position to a working position by said crankshaft drivingly engaging said second rotation gear assembly, said rotation connecting rod, said rotation first gear assembly, and said rotation rod.

12. The apparatus of claim 11 and further including a machining fluid flow path, said flow path providing a machining fluid to said working surface during surface contouring from a machining fluid supply and comprising:

a first tool body section conduit extending through said first tool body section;

a second tool body section conduit in fluid flow communication with said first conduit, said second conduit extending through said first plate substantially parallel to the direction of extension and retraction of said tool slide;

a third conduit comprising a telescoping tube slidably received by and in fluid flow communication with said second conduit, said third conduit in fluid flow communication with said machining head assembly;

whereby machining fluid flows from the machining fluid supply through said conduits to said machining head assembly for distribution during surface contouring operation.

13. The apparatus of claim 11 wherein said first rotation gear assembly comprises a worm gear drivingly engaged with a worm, said worm disposed on said rotation rod and a worm gear attached to said elongate rotation connecting rod.

14. The apparatus of claim 11 and further including means for limiting rotation of said machining head assembly, said means for limiting rotation being adjustable to properly position said machining head means relative to the working surface.

15. The apparatus of claim 1 and further including a proximity sensor means for determining when said tool slide is extended.

16. An apparatus for machining an interior portion of a component wherein the interior portion has a larger dimension than a bore through which at least a portion of the apparatus must be inserted for machining, said apparatus comprising:
   a first tool body section;
   a single second tool body section extending angularly from said first tool body section;
   a single tool slide having a tool holder at the end and slidably mounted in said second tool body section for movement between a retracted position substantially within said second tool body, for insertion through the bore of the component and for movement between different machining positions within the component, and an extended position for extending a tool mounted to said tool holder for machining;
   means for sliding said single tool slide between said retracted and extended positions; and
   said second tool body section has a channel for receiving said tool slide for movement between said retracted and extended positions, said channel tapering at an opening through which said tool slide extends to define a pair of sloped channel shoulders and said tool slide sloping outwardly at an end opposite said tool holder end to define a pair of sloped slide shoulders, said slide shoulders matingly engaging said channel shoulders when said tool slide is in said extended position to prevent said tool slide from becoming everextended.

17. The apparatus of claim 16, further comprising sensor means for indicating when said tool slide is extended.

18. The apparatus of claim 16, further comprising means for rotating a tool mounted in said tool holder about an axis substantially parallel to a direction of extension and retraction of said tool slide.

19. The apparatus of claim 16, further comprising means for supplying cooling fluid to the tool and to the interior portion of the component being machined.

* * * * *